United States Patent
Carlson et al.

(10) Patent No.: US 10,106,688 B2
(45) Date of Patent: Oct. 23, 2018

(54) CRACK-RESISTANT THERMOPLASTIC ROAD MARKING

(71) Applicant: 3M INNOVATIVE PROPERTIES COMPANY, St. Paul, MN (US)

(72) Inventors: Eugene H. Carlson, Apple Valley, MN (US); Jong-Min Kim, Hwaseong-Si (KR)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 5 days.

(21) Appl. No.: 15/026,092

(22) PCT Filed: Sep. 23, 2014

(86) PCT No.: PCT/US2014/057014
§ 371 (c)(1),
(2) Date: Mar. 30, 2016

(87) PCT Pub. No.: WO2015/048033
PCT Pub. Date: Apr. 2, 2015

(65) Prior Publication Data
US 2016/0244617 A1    Aug. 25, 2016

Related U.S. Application Data

(60) Provisional application No. 61/884,179, filed on Sep. 30, 2013.

(51) Int. Cl.

| | | |
|---|---|---|
| C09D 5/00 | (2006.01) | |
| C09D 5/33 | (2006.01) | |
| C09D 175/04 | (2006.01) | |
| C09D 133/02 | (2006.01) | |
| E01F 9/506 | (2016.01) | |
| E01F 9/512 | (2016.01) | |
| C08K 7/20 | (2006.01) | |
| C08L 23/06 | (2006.01) | |
| C08L 23/08 | (2006.01) | |
| C08L 57/02 | (2006.01) | |
| C09D 7/65 | (2018.01) | |
| C08K 3/013 | (2018.01) | |

(52) U.S. Cl.
CPC ............. *C09D 5/004* (2013.01); *C08K 3/013* (2018.01); *C08K 7/20* (2013.01); *C08L 23/06* (2013.01); *C08L 23/0853* (2013.01); *C08L 57/02* (2013.01); *C09D 7/65* (2018.01); *C09D 133/02* (2013.01); *C09D 175/04* (2013.01); *E01F 9/506* (2016.02); *E01F 9/512* (2016.02); *C08L 23/0869* (2013.01)

(58) Field of Classification Search
CPC ........ C09D 5/004; C09D 7/65; C09D 133/02; C09D 175/04; E01F 9/506; E01F 9/512
USPC .......................................................... 523/172
See application file for complete search history.

(56) References Cited

U.S. PATENT DOCUMENTS

| | | |
|---|---|---|
| 3,451,537 A | 6/1969 | Freeman |
| 3,523,029 A | 8/1970 | Searight |
| 3,935,158 A | 1/1976 | Watanabe |
| 4,342,810 A | 8/1982 | Adcock |
| 5,536,569 A | 7/1996 | Lasch |
| 6,217,252 B1 | 4/2001 | Tolliver |

FOREIGN PATENT DOCUMENTS

| | | |
|---|---|---|
| CA | 2825450 | 8/2012 |
| KR | 10-0914853 | 9/2009 |
| KR | 10-1044311 | 6/2011 |

OTHER PUBLICATIONS

Prismo Road Marking Products Technical Data Sheet, Jan. 2010, 1 page.
International Search Report for PCT International Application No. PCT/US2014/057014 dated Dec. 29, 2014, 2 pages.

*Primary Examiner* — Edward J Cain
(74) *Attorney, Agent, or Firm* — Carlos M. Téllez

(57) ABSTRACT

The present application generally relates to a thermoplastic road marker having improved crack-resistance, to compositions of such road markers, and to methods of making and applying these road markers. Some embodiments of the present disclosure relate to a thermoplastic road marking composition, comprising: ethylene vinyl acetate ("EVA") and/or ethylene acrylic acid ("EAA") copolymers in an amount of between about 1.5 wt % to about 6.0 wt %; and core-shell particles in an amount of between about 0.5 wt % and about 3.0 wt %. In at least some embodiments, the EVA and/or EAA have a melt flow index equal to or less than 45 g/10 min at 190° C.

13 Claims, No Drawings

CRACK-RESISTANT THERMOPLASTIC ROAD MARKING

CROSS REFERENCE TO RELATED APPLICATIONS

This application is a national stage filing under 35 U.S.C. 371 of PCT/US2014/057014, filed Sep. 23, 2014, which claims the benefit of U.S. Provisional Application No. 61/884,179, filed Sep. 30, 2013, the disclosures of which are incorporated by reference in their entirety herein.

TECHNICAL FIELD

The present application generally relates to a thermoplastic road marking having improved crack-resistance, to compositions of such road markings, and to methods of making and applying these road markings.

BACKGROUND

Pavement or road markings (e.g., paints, tapes, and individually mounted articles) guide and direct motorists and pedestrians traveling along roadways and paths. Pavement or road markings can be used on, for example, roads, highways, parking lots, and recreational trails, to form stripes, bars, and markings for the delineation of lanes, crosswalks, parking spaces, symbols, legends, and the like. Paint was a preferred pavement marking for many years. However, modern pavement marking materials offer significant advantages over paint, such as increased visibility, retroreflectance, improved durability, and temporary and/or removable marking options. Further, currently available road marking materials can be, for example, sheets, films, tapes, sprayable compositions, and raised pavement markers.

Pavement or road markings are subject to continuous wear and exposure to the elements as well as road chemicals. Consequently, there is a need for pavement or road marking compositions and materials that provide durability and retained reflectivity once applied to a surface and dried and/or hardened. Thermoplastic polymers are often included in road markings because they are highly durable. Additionally, the use of thermoplastic polymers in road markings results in shorter track-free time. "Track-free time," as used herein, is the time between application and the point where material will no longer transfer to vehicle tires. Shorter track-free times increase marking efficiency by reducing or eliminating the need for traffic disruption through such measures as closing lanes or placing traffic control devices to protect such markings.

Examples of thermoplastic road marking materials include, for example, ethylene acrylic acid ("EAA") polymers (see, for example, U.S. Pat. No. 6,217,252 (Tolliver)) or ethylene vinyl acetate ("EVA") polymers (see, for example, U.S. Pat. No. 5,536,569 (Lasch et al.)).

SUMMARY

The inventors of the present disclosure recognized that thermoplastic polymers are relatively brittle and crack during cold temperatures. Because pavement or road markings are outside year-round, they are exposed to very low temperatures and can experience cracking. The inventors of the present disclosure discovered ways to increase the crack-resistance of these thermoplastic pavement or road markings. More specifically, the inventors of the present disclosure recognized that by including core-shell particles in thermoplastic road markings including ethylene vinyl acetate and/or ethylene acrylic acid, the cold weather crack-resistance of the road markings can be improved. The inventors of the present disclosure also determined the most desirable and beneficial weight percentages of the core-shell particles and of the ethylene vinyl acetate and/or ethylene acrylic acid copolymers.

Some embodiments of the present disclosure relate to a thermoplastic road marking composition, comprising: ethylene vinyl acetate and/or ethylene acrylic acid copolymers in an amount of between about 1.5 wt % to about 6.0 wt %; and core-shell particles in an amount of between about 0.5 wt % and about 3.0 wt %. In some embodiments, the core-shell particles are selected from a group consisting essentially of acrylics, MBS, and/or MABS copolymers. In some embodiments, the ethylene vinyl acetate and/or ethylene acrylic acid copolymers have a melt flow index of between 2 g/10 min and 400 g/10 min.

Some embodiments are road or pavement markers. Some embodiments are a road marker having a crack-resistance that passes the cold impact test provided in 4.2.1.4 (using the process described in Annex H) of the National Standards Authority of Ireland Irish Standard No. I.S. EN 1871:2000 (copyright 2000). Some embodiments are road markers that, when ten road markers are tested, six of the tested road markers do not crack when a 110.0 g (+/−0.3 g and approximately a 30.0 mm diameter) steel ball is dropped on the road marker from a height of 2.00 m in conditions of a temperature of −10° C. (+/−3° C.) using the method of testing described in the National Standards Authority of Ireland Irish Standard No. I.S. EN 1871:2000 (copyright 2000) Section 4.2.1.4 (using the testing method described in Annex H). Some embodiments are road makers having an indentation time of greater than 20 minutes when tested according to the National Standards Authority of Ireland Irish Standard No. I.S. EN 1871:2000 (copyright 2000) Section 4.2.3.3 (using the testing method described in Annex J). Some embodiments are road markers having a percent residue flow of between about 3.0% and about 15%.

DETAILED DESCRIPTION

Some embodiments of the present disclosure relate to a thermoplastic road marking composition, comprising: ethylene vinyl acetate ("EVA") and/or ethylene acrylic acid ("EAA") copolymers in an amount of between about 1.5 wt % and about 6.0 wt %; and core-shell particles in an amount of between about 0.5 wt % and about 3.0 wt %.

Some exemplary commercially available EVA copolymers include, for example, Elvax™ 150, Elvax 250, Elvax 260, Elvax 350, Elvax 410, Elvax 450, Elvax 550, Ateva™ 1241, Ateva 1615, Ateva 1641, Ateva 9020, Ateva 9030, Evatane™ 20-20, Evatane 28-25, Evatane 28-40, Evatane 33-25, Evatane 33-45, Evatane 40-55, Escorene Ultra™ FL 01418, Escorene Ultra UL 02518CC, and Escorene Ultra UL 05540EH2. Some EVA copolymers capable of use in the retroreflective articles described and claimed herein have a melt flow index of between 2 g/10 min and 400 g/10 min.

Some exemplary commercially available EAA copolymers include, for example, Primacor 1430, Primacor 3004, Primacor 3440, Primacor 3460, Primacor 3330, Primacor 3340, Escor 5000 ExCo, Escor 5020 ExCo, Escor 5050 ExCo, Escor 5070, Escor 5200, Nucrel 699, Nucrel 960, Nucrel 3990, Nucrel 30907, and Nucrel 925. Some EAA copolymers capable of use in the retroreflective articles described and claimed herein have a melt flow index of between 2 g/10 min and 400 g/10 min.

Some exemplary commercially available core-shell particles include, for example, Durastrength™ 200, D300S, D320, Clearstrength™ W300, Paraloid™ EXL-2300, Paraloid EXL-2600, Paraloid EXL-3300, Paraloid EXL-3600, Paraloid EXL-5136, Paraloid EXL-6600, Paraloid BTA707, Paraloid BTA712, Paraloid BTA717, Paraloid BTA730, Paraloid BTA731, Paraloid BTA733ER, Metablen™ C-223A, Metablen C-323A, Metablen C-820J, Metablen C-830J, Metablen C-140A, Metablen C-130, Metablen W-300A, and Metablen W-450A.

In some embodiments, retroreflective or reflective articles, transparent microspheres, and/or skid-resisting particles are included in the composition or are placed on top of or adjacent to the composition. In some embodiments, these increase visibility or signaling performance of the road marker. Methods of applying the retroreflective or reflective articles, transparent microspheres, and/or skid-resisting particles are disclosed in, for example, U.S. Pat. No. 3,451,537, incorporated in its entirety herein.

In some embodiments, the road marking composition includes a pigment for enhancing its visual appearance. Exemplary pigments include titanium dioxide and yellow pigment 83. Some embodiments include a stabilizing agent that assists in providing UV or heat resistance. Exemplary stabilizing agents include, for example, hindered amine light stabilizers (HALS), phosphonate heat stabilizers, benzophenones, and zinc compounds. Stabilizing agents may be present at levels up to about 5%. Some embodiments include a rheology control agent that assists in providing settling resistance. Exemplary rheology control agents include, for example, bentone and fumed silica.

In at least some embodiments, the road marker composition is sprayed onto the road as a liquid composition.

Typical roadway surfaces are rough (rather than smooth). As such, good adhesion of the road marking composition to the roadway surface is preferred. The road marking compositions of the present disclosure adapt to and accommodate road surface irregularities.

Some embodiments are a road marker having a crack-resistance that passes the cold impact test provided in 4.2.1.4 (using the process described in Annex H) of the National Standards Authority of Ireland Irish Standard No. I.S. EN 1871:2000 (copyright 2000). Some embodiments are road markers that, when ten road markers are tested, six of the tested road markers do not crack when a 110.0 g (+/−0.3 g and approximately a 30.0 mm diameter) steel ball is dropped on the road marker from a height of 2.00 m in conditions of a temperature of −10° C. (+/−3° C.) using the method of testing described in the National Standards Authority of Ireland Irish Standard No. I.S. EN 1871:2000 (copyright 2000) Section 4.2.1.4 (using the testing method described in Annex H).

Some embodiments are road makers having an indentation time of greater than 20 minutes when tested according to the National Standards Authority of Ireland Irish Standard No. I.S. EN 1871:2000 (copyright 2000) Section 4.2.3.3 (using the testing method described in Annex J).

The following examples describe some exemplary constructions of various embodiments of the pavement or road markings and/or road or pavement marking compositions described in the present application. The following examples are intended to be illustrative, but are not intended to limit the scope of the present application.

EXAMPLES

Materials

The following materials were used in preparation of Comparative Examples A-U and Examples 1-2, below.

| Trade Designation | Material | Supplier |
|---|---|---|
| R-1100S | Hydrocarbon resin | Kolon Industries |
| CS-42F | Polyethylene wax | Coschem |
| 1500K | Aliphatic oil | Michang Oil Industries |
| CLASS 1 BEAD | Glass bead | Langfang |
| SD80 | Dolomite | Seongshin |
| SHF-T | Calcium carbonate | Seongchin Minefield |
| SONGSTAB SC-130 | Calcium stearate | Songwon |
| CR-828 | Titanium dioxide | Tronox |
| VASTOPLAST 708 | Amorphous polyolefin | Evonik Industries |
| VASTOPLAST 702 | Amorphous polyolefin | Evonik Industries |
| EASTOFLEX 1010PL | Amorphous polyolefin | Eastman Chemical |
| AFFINITY GA1900 | Amorphous Polyolefin | Dow Chemical |
| EXL-2314 | Core-shell particle | Dow Chemical |
| VC590 | EVA having a melt flow index at 190° C. of 4.0 g/10 min | Lotte Chemical |
| VA800 | EVA having a melt flow index at 190° C. of 20 g/10 min | Lotte Chemical |
| VA810 | EVA having a melt flow index at 190° C. of 45.0 g/10 min | Lotte Chemical |
| VA910 | EVA having a melt flow index at 190° C. of 400.0 g/10 min | Lotte Chemical |
| VA920 | EVA having a melt flow index at 190° C. of 150.0 g/10 min | Lotte Chemical |

Test Methods:

Cold Impact Resistance: cold impact resistance was measured generally following the procedure described in the European standard EN 1871 (2000) "Road Marking Materials; Physical Properties". Steel balls weighing 66.8 g and 110 g were dropped onto the material to be tested at low temperatures and using a brine solution. Results are expressed in class of material (e.g., CI0, CI1, CI2, and CI3), according to Table 7 of the standard, wherein CI3 indicates highest cold impact resistance.

Indentation: samples of road marking material were tested generally following the procedure described in EN 1871 (2000). The time it took for a probe to sink 10 mm into the road marking material using a 53.5 kg steel block weight was measured. Results are expressed in class of material (e.g., IN0, IN1, IN2, IN3, IN4, and IN5), wherein IN5 indicates that the indentation time was longer than 20 minutes.

Comparative Examples A-J

Comparative thermoplastic road marking compositions comprising polyolefin resins were prepared by mixing the ingredients listed in Table 1, below, at 200 degrees C. for at least 1 hour using a planetary mixer. Additionally, comparative Examples E-F, and G-J comprised core-shell particles.

TABLE 1

Composition of Comparative Examples A-J.

| Ingredients | Comp. Ex. A | Comp. Ex. B | Comp. Ex. C | Comp. Ex. D | Comp. Ex. E | Comp. Ex. F | Comp. Ex. G | Comp. Ex. H | Comp. Ex. I | Comp. Ex. J |
|---|---|---|---|---|---|---|---|---|---|---|
| R-1100S | 18 | 18 | 18 | 18 | 18 | 18 | 18 | 18 | 18 | 18 |
| CS-42F | 1.6 | 1.6 | 1.6 | 1.6 | 1.6 | 1.6 | 1.6 | 1.6 | 1.6 | 1.6 |
| 1500K | 1.0 | 1.0 | 1.0 | 1.0 | 1.0 | 1.0 | 1.0 | 1.0 | 1.0 | 1.0 |
| CLASS 1 BEAD | 20 | 20 | 20 | 20 | 20 | 20 | 20 | 20 | 20 | 20 |
| SD80 | 20 | 20 | 20 | 20 | 20 | 20 | 20 | 20 | 20 | 20 |
| SHF-T | 29.8 | 29.8 | 29.8 | 29.8 | 30.8 | 29.8 | 29.8 | 27.8 | 27.8 | 27.8 |
| SONGSTAB SC-130 | 0.3 | 0.3 | 0.3 | 0.3 | 0.3 | 0.3 | 0.3 | 0.3 | 0.3 | 0.3 |
| CR-828 | 4.3 | 4.3 | 4.3 | 4.3 | 4.3 | 4.3 | 4.3 | 4.3 | 4.3 | 4.3 |
| VASTOPLAST 708 | 5.0 | 0 | 0 | 0 | 3.0 | 3.0 | 2.5 | 2.5 | 0 | 0 |
| VASTOPLAST 702 | 0 | 5.0 | 0 | 0 | 0 | 0 | 2.5 | 2.5 | 5.0 | 0 |
| EASTOFLEX 1010PL | 0 | 0 | 5.0 | 0 | 0 | 0 | 0 | 0 | 0 | 5.0 |
| EXL-2314 | 0 | 0 | 0 | 0 | 1.0 | 2.0 | 0 | 2.0 | 2.0 | 2.0 |
| AFFINITY GA1900 | 0 | 0 | 0 | 5.0 | 0 | 0 | 0 | 0 | 0 | 0 |

Cold impact resistance and indentation were measured as described above. Results are reported in Table 2, below.

TABLE 2

Cold Impact Resistance and Indentation

| Examples | Cold impact resistance | Indentation |
|---|---|---|
| Comp. Ex. A | Cl 1 | IN2 |
| Comp. Ex. B | Cl 1 | IN2 |
| Comp. Ex. C | Cl 1 | IN5 |
| Comp. Ex. D | Cl 2 | IN5 |
| Comp. Ex. E | Cl 1 | IN3 |
| Comp. Ex. F | Cl 1 | IN4 |
| Comp. Ex. G | Cl 1 | IN3 |
| Comp. Ex. H | Cl 1 | IN3 |
| Comp. Ex. I | Cl 1 | IN3 |
| Comp. Ex. J | Cl 1 | IN5 |

Comparative Examples K-U

Road marking compositions were prepared as described in Comparative Examples A-J, above, except that EVA resins were used. In Comparative Examples S-U both EVA and polyolefin resins were used. Ingredients are listed in Table 3, below.

TABLE 3

Composition of Comparative Examples K-U

| Ingredients | C. Ex. K | C. Ex. L | C. Ex. M | C. Ex. N | C. Ex. O | C. Ex. P | C. Ex. Q | C. Ex. R | C. Ex. S | C. Ex. T | C. Ex. U |
|---|---|---|---|---|---|---|---|---|---|---|---|
| R-1100S | 18 | 18 | 18 | 18 | 18 | 18 | 18 | 18 | 18 | 18 | 18 |
| CS-42F | 1.6 | 1.6 | 1.6 | 1.6 | 1.6 | 1.6 | 1.6 | 1.6 | 1.6 | 1.6 | 1.6 |
| 1500K | 1.0 | 1.0 | 1.0 | 1.0 | 1.0 | 1.0 | 1.0 | 1.0 | 1.0 | 1.0 | 1.0 |
| CLASS 1 BEAD | 20 | 20 | 20 | 20 | 20 | 20 | 20 | 20 | 20 | 20 | 20 |
| SD80 | 20 | 20 | 20 | 20 | 20 | 20 | 20 | 20 | 20 | 20 | 20 |
| SHF-T | 32.3 | 30.8 | 30.8 | 32.3 | 31.8 | 31.3 | 29.3 | 29.3 | 30.8 | 30.8 | 30.8 |
| SONGSTAB SC-130 | 0.3 | 0.3 | 0.3 | 0.3 | 0.3 | 0.3 | 0.3 | 0.3 | 0.3 | 0.3 | 0.3 |
| CR-828 | 4.3 | 4.3 | 4.3 | 4.3 | 4.3 | 4.3 | 4.3 | 4.3 | 4.3 | 4.3 | 4.3 |
| VASTOPLAST 7082 | 0 | 0 | 0 | 0 | 0 | 0 | 0 | 0 | 2 | 0 | 0 |
| AFFINITY GA1900 | 0 | 0 | 0 | 0 | 0 | 0 | 0 | 0 | 0 | 2 | 2 |
| VC590 | 2.5 | 4.0 | 0 | 1.5 | 2.0 | 0 | 0 | 0 | 2 | 0 | 1 |
| VA800 | 0 | 0 | 4.0 | 0 | 0 | 0 | 0 | 0 | 0 | 0 | 0 |
| VA910 | 0 | 0 | 0 | 0 | 0 | 2.5 | 4 | 0 | 0 | 2 | 1 |
| VA920 | 0 | 0 | 0 | 0 | 0 | 0 | 0 | 4 | 0 | 0 | 0 |
| VA810 | 0 | 0 | 0 | 0 | 0 | 0 | 0 | 0 | 0 | 0 | 0 |
| EXL-2314 | 0 | 0 | 0 | 1.0 | 1.0 | 0 | 0 | 0 | 0 | 0 | 0 |

Cold impact resistance and indentation are listed in Table 4, below.

TABLE 4

Cold Impact Resistance and Indentation

| Examples | Cold impact resistance | Indentation |
| --- | --- | --- |
| Comparative Example K | CI1 | IN5 |
| Comparative Example L | CI2 | IN5 |
| Comparative Example M | CI1 | IN5 |
| Comparative Example N | CI1 | IN5 |
| Comparative Example O | CI2 | IN5 |
| Comparative Example P | CI2 | IN4 |
| Comparative Example Q | CI2 | IN4 |
| Comparative Example R | CI2 | IN5 |
| Comparative Example S | CI1 | IN3 |
| Comparative Example T | CI2 | IN3 |
| Comparative Example U | CI2 | IN3 |

Examples 1-2

Road marking compositions were prepared as described in Comparative Examples A-J, above, except that core-shell particles and EVA resins having a melt flow index equal to or less than 45 g/10 min at 190° C. were used. Ingredients are listed in Table 5, below.

TABLE 5

Composition of Examples 1 and 2

| Ingredients | Example 1 | Example 2 |
| --- | --- | --- |
| R-1100S | 18 | 18 |
| CS-42F | 1.6 | 1.6 |
| 1500K | 1.0 | 1 |
| CLASS 1 BEAD | 20 | 20 |
| SD80 | 20 | 20 |
| SHF-T | 31.3 | 29.3 |
| SONGSTAB SC-130 | 0.3 | 0.3 |
| CR-828 | 4.3 | 4.3 |
| VC590 | 2.5 | 0 |
| VA810 | 0 | 4 |
| EXL-2314 | 1.0 | 1.5 |

Cold impact resistance and indentation were measured. Results are shown in Table 6, below.

TABLE 6

Cold Impact Resistance and Indentation

| Examples | Cold impact resistance | Indentation |
| --- | --- | --- |
| Example 1 | CI3 met | IN5 met |
| Example 2 | CI3 met | IN5 met |

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

What is claimed is:

1. A thermoplastic road marking composition, comprising:
   at least one of an ethylene vinyl acetate copolymer and/or an ethylene acrylic acid copolymer having a melt flow index equal to or less than 45 g/10 min at 190° C. in an amount of between about 2.5 wt % to about 4.5 wt %; and
   core-shell particles in an amount of between about 0.5 wt % and about 2.5 wt %.

2. The thermoplastic road marking composition of claim 1, wherein the ethylene vinyl acetate copolymer and/or an ethylene acrylic acid copolymers have a melt flow index of between 2 g/10 min and 40 g/10 min at 190° C.

3. A road marker including the thermoplastic road marking composition of claim 1.

4. The road marker of claim 3, having a crack-resistance that passes the cold impact test provided in Section 4.2.1.4 of the National Standards Authority of Ireland Irish Standard No. I.S. EN 1871:2000.

5. The road marker of claim 3, having a crack resistance that when ten road markers are tested, six of the ten tested road markers do not crack when a 110.0 g (+/−0.3 g) steel ball (approximately 30.0 mm in diameter) is dropped on the road marker from a height of 2.00 m in conditions of a temperature of −10° C. (+/−3° C.) using the testing method described in the National Standards Authority of Ireland Irish Standard No. I.S. EN 1871:2000 Section 4.2.1.4 and Annex H.

6. The road marker of claim 3, having an indentation time of greater than 20 minutes when tested according to the National Standards Authority of Ireland Irish Standard No. I.S. EN 1871:2000 Section 4.2.3.3 (using the testing method described in Annex J).

7. The thermoplastic road marking composition of claim 1, wherein the core-shell particles are selected from a group consisting essentially of acrylics, MBS, and/or MABS copolymers.

8. The thermoplastic road marking composition of claim 1, further comprising retroreflective articles.

9. The thermoplastic road marking composition of claim 1, further comprising transparent microspheres.

10. A method of using the thermoplastic road marking composition of claim 1, wherein the thermoplastic road marking composition is sprayed onto a road.

11. The thermoplastic road marking composition of claim 1, comprising:
    an ethylene vinyl acetate copolymer having a melt flow index equal to or less than 45 g/10 min at 190° C. in an amount of between about 2.5 wt % to about 4.5 wt %.

12. The thermoplastic road marking composition of claim 1, further comprising a hydrocarbon resin, a wax, an aliphatic oil, glass beads, dolomite, calcium carbonate, calcium stearate, a pigment, or a combination thereof.

13. The thermoplastic road marking composition of claim 1, further comprising a wax.

* * * * *